United States Patent [19]
Castle et al.

[11] Patent Number: 6,011,244
[45] Date of Patent: Jan. 4, 2000

[54] ELECTRICALLY HEATED WINDOW

[75] Inventors: Derek Charles Castle, West Midlands; Mark Andrew Chamberlain, Birmingham, both of United Kingdom

[73] Assignee: Pilkington United Kingdom Limited, Merseyside, United Kingdom

[21] Appl. No.: 08/787,683

[22] Filed: Jan. 23, 1997

[30] Foreign Application Priority Data

Jan. 30, 1996 [GB] United Kingdom ................... 9601865

[51] Int. Cl.⁷ ............................. H05B 3/06; H05B 1/00
[52] U.S. Cl. ..................... 219/522; 219/201; 219/202; 219/203; 219/219
[58] Field of Search .................................. 219/522, 200, 219/203, 219, 528, 544, 546–549

[56] References Cited

U.S. PATENT DOCUMENTS

| | | |
|---|---|---|
| 3,409,759 | 11/1968 | Boicey et al. . |
| 3,729,616 | 4/1973 | Gruss et al. . |
| 3,795,472 | 3/1974 | Gruss et al. . |
| 3,947,618 | 3/1976 | Gruss . |
| 3,995,142 | 11/1976 | Ciardelli et al. ................. 219/522 |
| 4,209,687 | 6/1980 | Bethge et al. . |
| 4,395,622 | 7/1983 | Dran et al. . |
| 5,282,301 | 2/1994 | Roentgen et al. . |

FOREIGN PATENT DOCUMENTS

| | | |
|---|---|---|
| 0385791B1 | 3/1990 | European Pat. Off. . |
| 0443691A2 | 8/1991 | European Pat. Off. . |
| 0 506 521 | 9/1992 | European Pat. Off. . |
| 2075352 | 10/1971 | France . |
| 1332721 | 10/1973 | United Kingdom . |
| 1365785 | 9/1974 | United Kingdom . |

Primary Examiner—Teresa Walberg
Assistant Examiner—Thor Campbell
Attorney, Agent, or Firm—Burns, Doane, Swecker & Mathis, L.L.P.

[57] ABSTRACT

A window is provided which includes an array of fine, closely spaced wires through which electric current is passed to heat the window. Such windows are useful as vehicle windows, e.g. windscreens, because the heating disperses ice or condensation on the surface of the window, thereby improving visibility. According to the invention, at least some of the wires extend along diverging lines, so that the heated area extends over substantially the whole of the transparent portion of the window. It is also described how to achieve a sufficiently uniform heating effect over the extended heated area. A method of manufacturing such windows, and an apparatus for forming such arrays of wires, are also provided.

26 Claims, 5 Drawing Sheets

ELECTRICALLY HEATED WINDOW

BACKGROUND OF THE INVENTION

1. Field of the Invention

The present invention relates to an electrically heated window, and more particularly but not exclusively to a laminated vehicle window comprising a number of plies, the window including an array of fine, closely spaced wires extending over one of the plies and forming a heating element, the heating effect resulting from passage of electric current through the wires.

2. Description of the Related Art

Such windows may be installed as the windscreen, rear window, or other window of a car or other vehicle, or as a window (especially the windscreen) of a commercial vehicle, locomotive or aircraft, or in a boat or ship. The electric heating is used to disperse condensation or ice on the surfaces of the window, and thereby maintain good visibility through the window.

At its simplest, a laminated window comprises an inner ply of interlayer material ("the interlayer") disposed between two outer plies of rigid transparent sheet glazing material, but more sophisticated laminated windows comprise greater numbers of plies of interlayer and glazing material, for example so as to confer greater resistance to impact damage upon the window, and reduce the risk of penetration of the window. The interlayer is normally a flexible plastics material, e.g. polyvinylbutyral, and the glazing material may be glass or a rigid plastics material. Laminated windows are also known comprising two or more plies, in which an exposed outer ply is a ply of flexible plastics material which may both increase penetration resistance and reduce the risk of laceration by fragments of glazing material during an impact. Such a plastics outer ply normally forms the inward-facing surface of the window, and is generally subjected to a surface treatment to increase its abrasion resistance.

An electrically heated window comprising an array of fine, closely spaced wires is known from U.S. Pat. No. 3,729,616. This document describes a laminated window having a pattern of wrinkled resistance wires with the wrinkles oriented in non-parallel random fashion so as to reduce glare from the wires when the window is used as a windscreen. The heated area is generally rectangular, and since a windscreen is normally approximately the shape of a trapezium, there are generally triangular areas adjacent each short edge of the windscreen which are unheated. Obviously, any condensation or ice in these unheated areas will remain in place, impairing visibility through the windscreen. In the present specification, "trapezium" is used to mean a quadrilateral with only one pair of sides parallel.

In modern windscreens, the unheated triangular areas are substantial, and may even include part of the area normally wiped by the windscreen wipers (the "wiped area"). The resulting impairment of visibility is most undesirable, and may have serious safety consequences. Furthermore, when ice remains present in the wiped area, damage to the wiper blades may occur as a result of scraping over the ice. A prior art windscreen, showing such unheated areas, is illustrated in FIG. 1 of the present application; it would be desirable to be able to heat such areas also.

One possible solution is described in GB 1,365,785, which is primarily concerned with the problems of electrical discontinuities and resistance varying with path length, but also discloses an arrangement which heats substantially the whole of two particular shapes of window. Two windows, in the shape of a rectangle and a trapezium respectively, are described in which the wires run from side to side, i.e. parallel to the two long, parallel, edges. If the window were a windscreen, the wires would therefore be parallel to the top and bottom edges. The wires are arranged in a number of "elements", each with its own "collectors", and these elements are connected in series so that the varying resistances of the elements are compensated for, and the same current flows through each element. The complexity of the circuit would however make it expensive to manufacture.

Moreover, this arrangement does not solve the problem of extending the heated area in most modern vehicle windows, which have curved edges and so are only approximately the shape of a trapezium. GB 1,365,785 only shows how to extend the heated area in windows of the particular shapes and with wires of the particular orientations disclosed, i.e. parallel to the long edges of a window. In actual fact, when the window is a windscreen, it is greatly preferred to arrange the wires to run at right angles to the two long, generally parallel, edges, i.e. from top to bottom. This arrangement facilitates the heating of all of the primary vision area (as defined in safety standards for vehicles), and reduces the optical interference to vision caused by the wires, especially as windscreens are installed at increasing rake angles, i.e. closer to the horizontal. A more general approach to the problem of extending the heated area of vehicle windows is therefore needed.

EP 32,139, which corresponds to U.S. Pat. No. 4,395,622, describes a solution to the subsidiary problem of part of the wiped area being unheated. The wires are laid along circular arcs extending in the direction of movement of the wiper. The patent teaches that the heated area should be arranged to approximately coincide with the wiped area; a substantial portion of the window is therefore left unheated as in U.S. Pat. No. 3,729,616. The patent does not therefore address the problem of extending the heated area beyond the wiped area.

GB 1,566,681, corresponding to U.S. Pat. No. 4,209,687, addresses the problem of diffractive effects occurring as a result of light passing through fine, closely spaced wires in an electrically heated window. It is suggested that each wire is formed as a helix to alleviate such effects. Neighbouring helices may be disposed in parallel, trapezoidal, meandering or undulating relation according to the pattern desired. However, no indication is given as to how the helices are formed, how they are laid down in these various relationships, or why a particular pattern may be desired, and so this document does not assist the skilled person seeking to extend the heated area of a window.

SUMMARY OF THE INVENTION

A need therefore remains for an improved electrically heated window which is heated by means of an array of wires extending over substantially all of the transparent portion of the window, and which can be produced economically. It is also important to ensure that the heating effect does not vary excessively in intensity over an extended heating area, otherwise the variation in time taken to clear frost or condensation from different areas of the window would be unacceptable in practice.

It has now been found, contrary to expectation, that it is possible to provide such a window by arranging that the wires extend along diverging lines. Whereas it has apparently been the belief in the past that arranging wires to extend along non-parallel lines was not in practice feasible, it has now been found possible, surprisingly, to modify in a relatively simple manner as hereinafter described, one of the known types of apparatus for laying down the wires, in order to arrange them along diverging lines in a practical and economical manner. Furthermore, ways have been found to control the intensity of the heating effect within acceptable limits of variation over the whole of the extended heated area.

According to the present invention there is provided an electrically heated window laminated from at least two plies of glazing material and at least one ply of interlayer material extending between the plies of glazing material, the window including:

an array of fine, closely spaced wires carried by one of the plies, electrical connection means for connecting the array to an electrical supply so as to pass current through the wires and heat the window, characterised by at least some of the wires extending along diverging lines so that the array extends over substantially the whole of the transparent portion of the window. The diverging lines may be straight or curved.

By the term "electrical connection means", the skilled person understands in the present context that any of the items generally used in such windows to connect the array of wires are meant, including busbars; leads; tags; plugs, spades and their corresponding sockets. The lines along which the wires extend are imaginary in the sense that, until wires are actually laid along the lines during manufacture of the window, the position of the lines cannot be determined by inspection. The wires themselves may be crimped or otherwise locally bent in a regularly or irregularly repeating fashion to alleviate undesirable optical effects, as will be described in more detail below; it would therefore be imprecise to define the present invention by defining that the wires themselves diverge because, if examined closely, it will be seen that crimped wires may in fact repeatedly diverge and converge along their length. The present invention is primarily concerned with the configuration and orientation of wires across a window as a whole, and secondarily with smaller scale shaping, e.g. crimping, of the wires. It will be appreciated that it is possible to lay either crimped or uncrimped wires along lines as defined by the present invention.

In a preferred embodiment of the invention, the array of wires comprises one or more groups of wires extending along substantially parallel straight lines, and the wires adjacent the group(s) extending along diverging lines. This embodiment has the advantage that with most apparatus it is faster to lay the wires on a piece of interlayer in this fashion (as will be described later), and the programming of the apparatus is simplified.

In another embodiment of the invention, substantially all of the wires comprised in the array extend along diverging lines. This embodiment has the advantage of being very flexible in terms of the variety of window shapes which may be wired. This is because there is a limit to the angle of divergence between the line along which one wire extends, and the line along which an adjacent wire extends (if the angle is too large, an unheated area is left), but if every line diverges from the previous one, it is possible for the total angle between the opposite sides of the wired area to become relatively large, and hence to accommodate increasingly extreme window shapes.

Preferably at least some of the lines along which the wires extend are substantially parallel to one edge of the window.

A window according to the invention may have at least one pair of opposed non-parallel sides. Such a window is especially suitable for use as a vehicle windscreen since the heated area may extend to the bodywork pillars at the sides of the windscreen, known in the car industry as the A-posts, which are generally inclined towards each other, as well as towards the rear of the vehicle.

Normally, the window is in the approximate shape of a trapezium, but with curved edges and at least some of the wires extend along diverging lines in directions from the shorter of the two substantially parallel edges of the trapezium towards the longer of the two substantially parallel edges.

To manufacture the embodiments of the invention mentioned above, it has been found necessary to improve upon the known processes and apparatuses employed in the manufacture of conventional electrically heated windows. In particular, apparatus which has in the past been employed to assemble the array of wires for incorporation as part of the heating element (commonly referred to as a wiring machine) has been found unsatisfactory when making windows according to the invention.

A known apparatus is described in U.S. Pat. No. 3,795, 472 (divisional of U.S. Pat. No. 3,729,616, which was mentioned earlier). A wiring machine is provided comprising a rotatably mounted drum with a wire supply device at one side. A sheet of interlayer to be wired is attached to the drum and rotated, while wire is supplied from the wire supply device. This device is caused to move gradually in a direction parallel to the axis of rotation of the drum, so that successive turns of wire are deposited on the interlayer, each turn of wire being in spaced relationship to the previous one to produce a helical coil wrapped around the drum. The coil is cut open along an axial line on the surface of the drum, in the gap between two adjacent edges of the interlayer, and the sheet of interlayer is removed from the drum and placed on one of the plies of glazing material for assembly into a laminated window.

This apparatus yields a product in which the wires are disposed along parallel straight lines, even though, on close inspection, it would not be precise to describe the wires themselves as parallel because of the randomly oriented wrinkles. It is not possible to manufacture the improved wired products mentioned above on this apparatus.

Another wiring machine including a drum is described in EP 443,691. While various improvements over the machine of U.S. Pat. No. 3,795,472 are disclosed, they do not concern the orientation of the lines along which the wires are deposited, which in the finished window are still disposed along straight and parallel lines.

A different type of wiring machine is described in EP 32,139. This comprises a flat table on which a sheet of interlayer is placed, a sliding bridge disposed above the table and spanning it, a wire laying member slidably mounted on the bridge and attached to a connecting rod which pivots about a vertical axis. The wire-laying member slides back and forth on the bridge in reciprocating manner, but because the bridge is itself also free to slide in reciprocating manner, and the wire-laying member is constrained by the connecting rod, the net movement is along a circular path. Wires can only be laid along diverging lines with this apparatus by laying successive wires along non-concentric circular curves. As a result, this machine is not suitable for laying wire in arrays that extend over substantially the whole of the transparent portion of a window of a shape employed in a modern vehicle.

None of these known wiring machines has therefore been found suitable for use in the manufacture of the improved wired products mentioned above.

An improved process and apparatus for making the improved wired products mentioned above has now been developed; the underlying advance being to provide an extra degree of freedom of movement to the wire supply and setting device (the "wiring head"), together with associated control means to control the extra movement.

According to these aspects of the invention there is first provided a process for the manufacture of an electrically heated window as claimed in claim 1, part of the process being performed on an apparatus which includes an endless support surface, rotatable about an axis, for supporting the interlayer material, and a wiring head for supplying wire and laying it on the interlayer material, the support surface and wiring head being movable relative to each other in a direction parallel to said axis, and the process including the steps of:

securing a piece of interlayer in position on the support surface, causing the support surface to rotate, laying wire by setting it in contact with the interlayer material by means of the wiring head while the support surface rotates, so that successive turns of wire are laid on the interlayer material, stopping rotation of the support surface when the desired number of turns of wire has been laid, the process being characterised by:

cutting the coil in a direction parallel to the axis, so that it may be opened out as a generally flat array of wires, removing the wired piece of interlayer from the support surface and providing the array of wires with electrical connections, and assembling the piece of interlayer material into a laminated window, wherein while laying the wire the process includes:

moving the support surface and the wiring head back and forth relative to each other in reciprocating manner in the direction parallel to said axis, and in coordination with the rotation of the support surface, to provide an array of wires on the interlayer material in which at least some of the wires extend along diverging lines. Clearly, the relative movement between the support surface and the wiring head may be provided as a result of movement of the support surface alone, or of the wiring head alone, or of both together.

Secondly there is also provided an apparatus for forming an array of wires on a piece of interlayer material during the manufacture of an electrically heated window, the apparatus including an endless support surface, mounted for rotation about an axis, for supporting the interlayer material, and a wiring head for supplying wire and laying it on the interlayer material, the support surface and the wiring head being arranged for relative movement in a direction parallel to said axis, characterised by drive means for causing the support surface and wiring head to reciprocate relative to each other in said direction, and control means for controlling the drive means to coordinate the reciprocating movement with the rotation of the support surface, so that the wiring head lays wire along diverging lines.

Preferably, the wiring head is movably mounted on an elongate member which extends parallel to said axis, and is propelled along said elongate member in reciprocating manner by the drive means.

BRIEF DESCRIPTION OF THE DRAWINGS

The invention will now be illustrated by the following non-limiting description of particular embodiments with reference to the accompanying drawings in which like reference numerals denote like elements throughout the various figures. In the drawings.

DETAILED DESCRIPTION OF PREFERRED EMBODIMENTS

Figure 1:
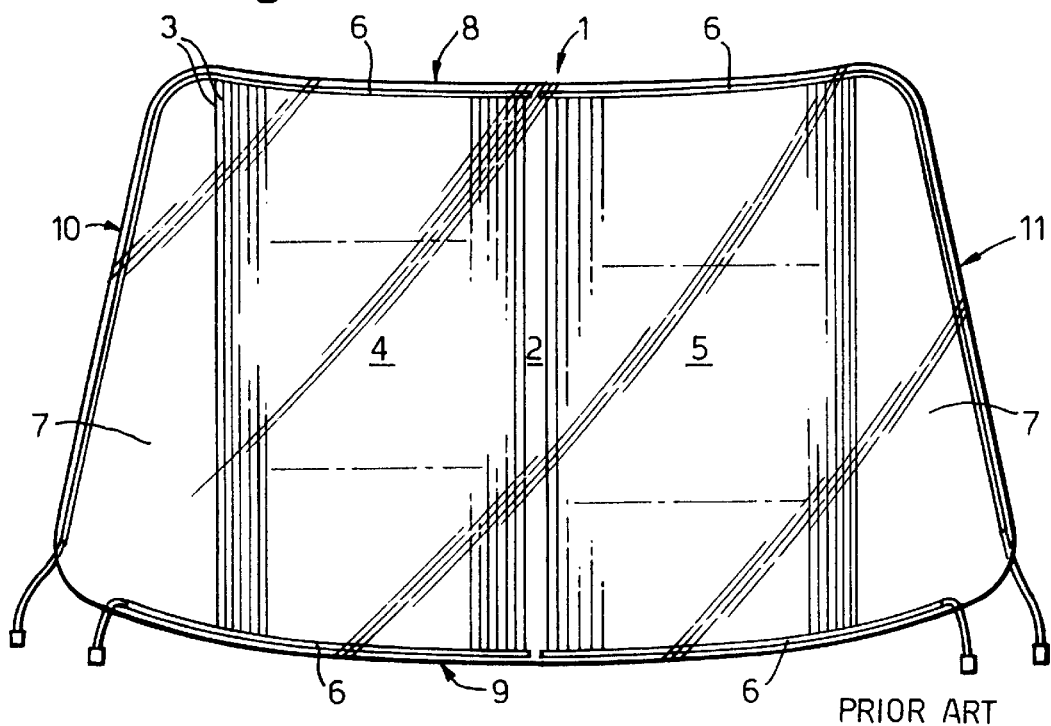
FIG. 1 is a general view of a known electrically heated window, viewed in a direction approximately normal to the surface of the window.

FIG. 1 shows a known electrically heated window 1 suitable for use as the windscreen of a vehicle. It comprises an area 2 heated by an array of fine, closely spaced wires 3. The wires are arranged in two heating elements 4 and 5 extending between respective busbars 6, by means of which electric current is supplied to the two elements independently.

It will be appreciated that as the heating wires are positioned very close to one another in heated windows of the type described in this specification, it is not possible to represent in the drawings all the wires that are actually present in such windows. Consequently it should be understood that only a proportion of the heating wires are shown in the drawings of this specification, and they are shown further apart than is actually the case. Furthermore, to avoid excessive repetition for the draughtsman, where the area covered by wires is relatively large, no wires have been drawn in over part of the area. Instead, dot-dashed lines have been used to indicate the extent of the area covered by wires.

The window 1 is generally in the shape of a trapezium, with generally parallel edges 8 and 9, and non-parallel edges 10 and 11. All these edges are slightly curved.

The result of providing a heated area 2 comprising wires extending along parallel straight lines is that the heated area is rectangular, and so two generally triangular areas 7 remain unheated. Unfortunately it is not feasible to simply continue the straight, parallel wires across areas 7, because the resistance, and hence the length, of each wire 3 should not be varied excessively if satisfactory performance (i.e. moderately uniform heating) is to be obtained.

References in this specification to the form of a line along which a heating wire extends (e.g. as "straight") are references to the form of the line when the piece of interlayer material is placed on a flat surface. When a piece of interlayer material comprising wires extending along straight lines is assembled into a curved window, and is placed between curved plies of glazing material, the lines obviously adopt the curvature of the glazing material, and only appear absolutely straight at a particular point in the window when viewed in a direction normal to the surface of the window at that point.

A window having heating wires extending along parallel straight lines (as shown in FIG. 1) may be made using the prior art apparatus known from EP 443 691 for laying the heating wires.

Figure 2:
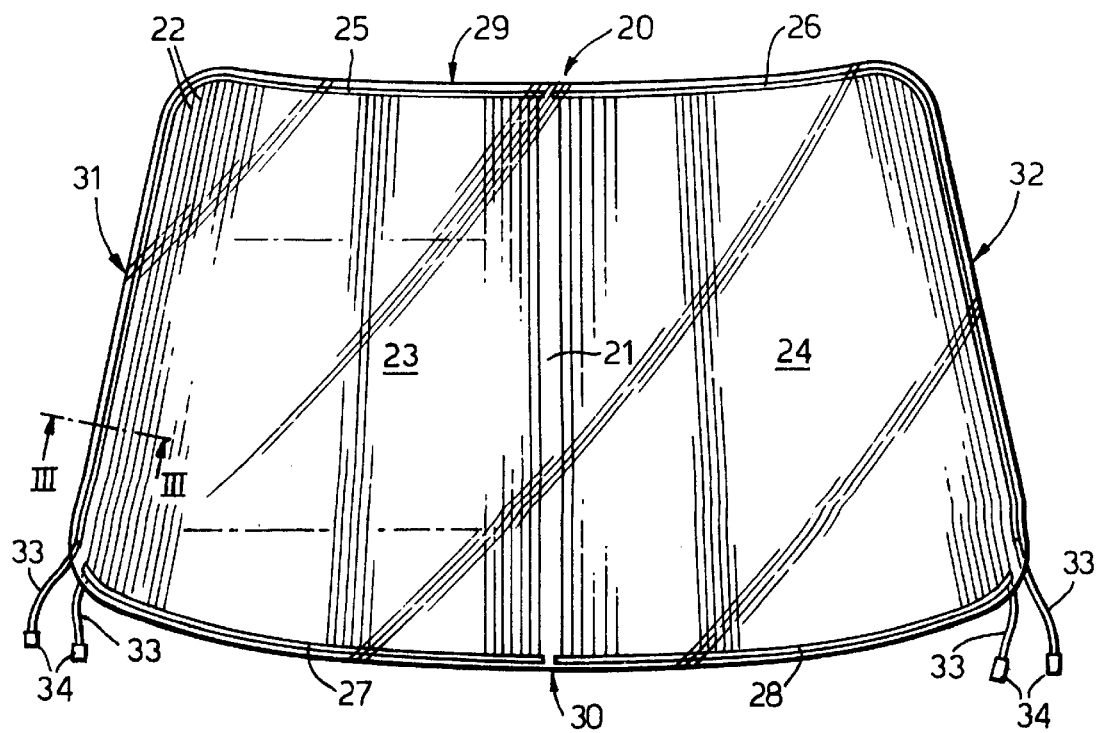
FIG. 2 is a general view of a first embodiment of electrically heated window according to the invention, viewed in a corresponding direction to FIG. 1.

FIG. 2 shows an electrically heated window according to a first embodiment of the invention. This window 20 is suitable for use as a heated vehicle windscreen, and is heated by a heating means which extends over substantially the whole of the transparent portion of the window. The window has long edges 29 and 30, and short edges 31 and 32, the long edges being substantially parallel so that the window has the general shape of a trapezium, allowing for the curvature of the edges. When the window is installed in the orientation which is usual for a windscreen, long edge 29 forms the top edge, long edge 30 forms the bottom edge, and short edges 31,32 form the sides of the windscreen.

Figure 3:
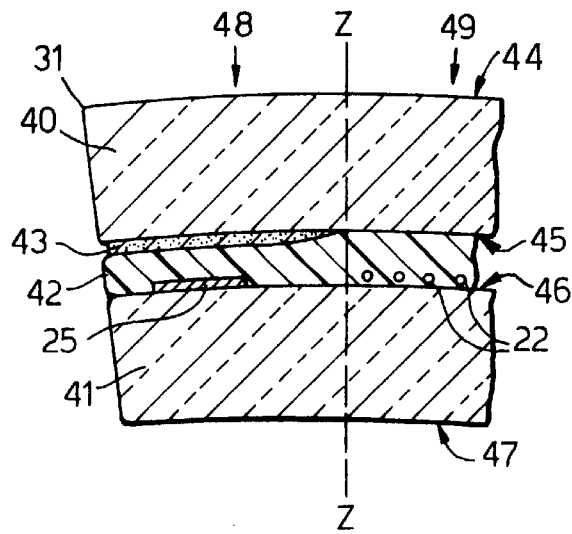
FIG. 3 is a greatly enlarged cross-sectional view of a small marginal part of the window of FIG. 2, taken on the line III—III of FIG. 2.

FIG. 3 is a cross-section of the window 20 taken along the line III—III of FIG. 2. The window comprises two plies of sheet glazing material which may be curved, the ply forming the external surface 44 of the window 20 being designated the outer ply 40, and the ply forming the inner surface 47 of the window (i.e. the surface of the window which, after glazing, faces towards the inside of the object, e.g. a vehicle, to be glazed by the window) being designated the inner ply 41. While plies 40,41 may be composed of any rigid transparent sheet glazing material (e.g. various plastics), a preferred material is glass. The plies have further surfaces 45,46 which are bonded together to form a laminate by a ply of interlayer material 42, which is transparent in the finished product, extending between the plies of glazing material. The interlayer is generally composed of a plastics material with suitable physical and chemical properties to bond the plies of glazing material together, and confer on the product the requisite performance for its application, e.g. in terms of safety, optical performance etc. A suitable interlayer material is polyvinylbutyral ("pvb"), but other interlayer materials may be used. As mentioned above, other constructions of laminated windows exist which involve more or fewer plies.

Still referring to FIG. 3, a substantially opaque band 43 (known in the vehicle glazing industry as an obscuration band) is disposed around the periphery of one face of one of the plies, preferably the inner face 45 of the outer ply 40. The obscuration band 43 may be in the form of a printed coating composed of a ceramic (frit-based) ink. The obscuration band serves to hide the receiving flange of the vehicle bodywork when the windscreen is glazed in position; and when the window is adhesively glazed, the band not only conceals but also protects the adhesive and/or sealant from light, especially its ultra-violet component. In this specification, references to a transparent portion of the window are references to the portion not obscured by the obscuration band. In FIG. 3, an imaginary line Z—Z is shown dividing the opaque portion 48 from the transparent portion 49.

Preferably the obscuration band 43 is disposed on inner face 45 of the outer ply 40 because in this position, the band is additionally able to conceal from external view components, e.g. busbars, situated on a peripheral surface of the ply of interlayer 42. For this reason, the obscuration band has been omitted from FIG. 2 in order to reveal the busbars. If the obscuration band is disposed on a different surface, for example surface 47, it is possible to apply an organic primer to the inner face 45 instead, so that components situated on a peripheral surface of the ply of interlayer are still concealed.

Referring to FIG. 2 again, the window 20 is heated by heating means comprising an array 21 of fine, closely spaced wires 22 disposed on a surface of one of the plies, preferably on the inner face of the ply of interlayer material, although it is entirely possible to carry out the invention with the wires disposed on the outer face of the ply of interlayer material, or in the middle of the ply, especially if it is a composite ply. Indeed, the invention also includes windows in which the wires are disposed on a face of one of the other plies, providing they are suitably protected. The array may comprise two or more heating elements 23,24, each element having its own current supply. This arrangement is preferable for large windows since such windows, when supplied with power from a standard nominal 12 volt vehicle supply, draw a substantial current. Splitting the array into independently supplied elements reduces the load on the various electrical connection means which supply current to each element; clearly the number of elements may be varied according to the size of the windscreen.

In the window of FIG. 2, the elements 23 and 24 extend between electrical connection means in the form of respective busbars. Accordingly there are two busbars 25,26 which extend along the top edge 29 of the windscreen, and two busbars 27,28 which extend along the bottom edge 30. The busbars are made from electrically conductive strip, normally metal strip, for example, copper strips 3–6 mm wide, preferably 6 mm wide and about 0.04–0.08 mm thick. The strips are preferably tinned with a surface layer of tin, or tin lead alloy (Sn:Pb ratio of 60:40) to protect the copper from oxidation.

In this windscreen, the top busbars 25,26 extend around the top corners, and down the sides 31,32 of the windscreen. The busbars 25,26,27,28 may be connected to flying leads 33 by soldering, possibly via a small connector tag of known design for neatness (not shown), and the leads have terminations 34 appropriate for connection to a voltage supply. Alternatively, conventional spade connectors may be soldered to the ends of the busbars, and leads attached to the spades. These leads, tags, terminations and connectors also constitute electrical connection means.

The wires 22 are preferably attached to the strip forming the busbars 25,26,27,28 by use of a further piece of busbar strip (not shown) to form a sandwich with the wires between the two strips, a face of at least one of the busbar strips being provided with a surface layer of low melting point solder such that the solder melts on autoclaving to provide good electrical contact between the busbar strip and the wires. Such a technique is known from EP 385 791.

The wires 22 are preferably composed of tungsten, and are preferably 10–30 μm thick for a nominal operating voltage of 12 volts; typically, the array 21 of wires for a windscreen may include between 300 and 900 wires according to the size of the windscreen and the wire spacing used. The wires are arranged to extend along diverging lines so that the array extends over substantially the whole of the transparent portion 49 (the transparent portion 49 having been described above in connection with the illustration in FIG. 3) of the window. With this shape of window, the wires extend along lines which diverge in a direction from one long edge (top edge 29) to the other, generally parallel, long edge (bottom edge 30). The wires may be said to fan out, and as a result the wires adjacent the short edges 31 and 32 are substantially parallel to those respective edges. Clearly, this arrangement of wires may also be described as converging in a direction from the bottom edge 30 to the top edge 29. In this embodiment, substantially all the wires comprised in the array 21 extend along diverging lines, and as has been mentioned above, this arrangement affords greater flexibility in terms of the shapes of windscreen that can be satisfactorily wired. While in most windscreens the angle between the sides 31 and 32 lies in the range from 5° to 20°, with this arrangement it is possible to wire windscreens of more extreme shape (such as racing-car windscreens) in which that angle is over 50°. The limit also depends on the relative proportions of a window, and so different values may apply to other types of window than windscreens.

It is known to those skilled in the art, that when a bright light from a point source, such as one of the headlights of an oncoming vehicle, shines through a windscreen having an array of fine, closely spaced straight wires, undesirable secondary optical effects may occur (believed to be due to reflections from the wires) which disrupt the vehicle driver's vision through the windscreen. As is common practice in the art, the wires 22 of window 20 normally have undulations to alleviate these effects, e.g. they are crimped in a sinusoidal pattern. Other patterns may be used, such as a zig-zag, or a helical spiral, or indeed the undulations may be random in nature.

Figure 4:
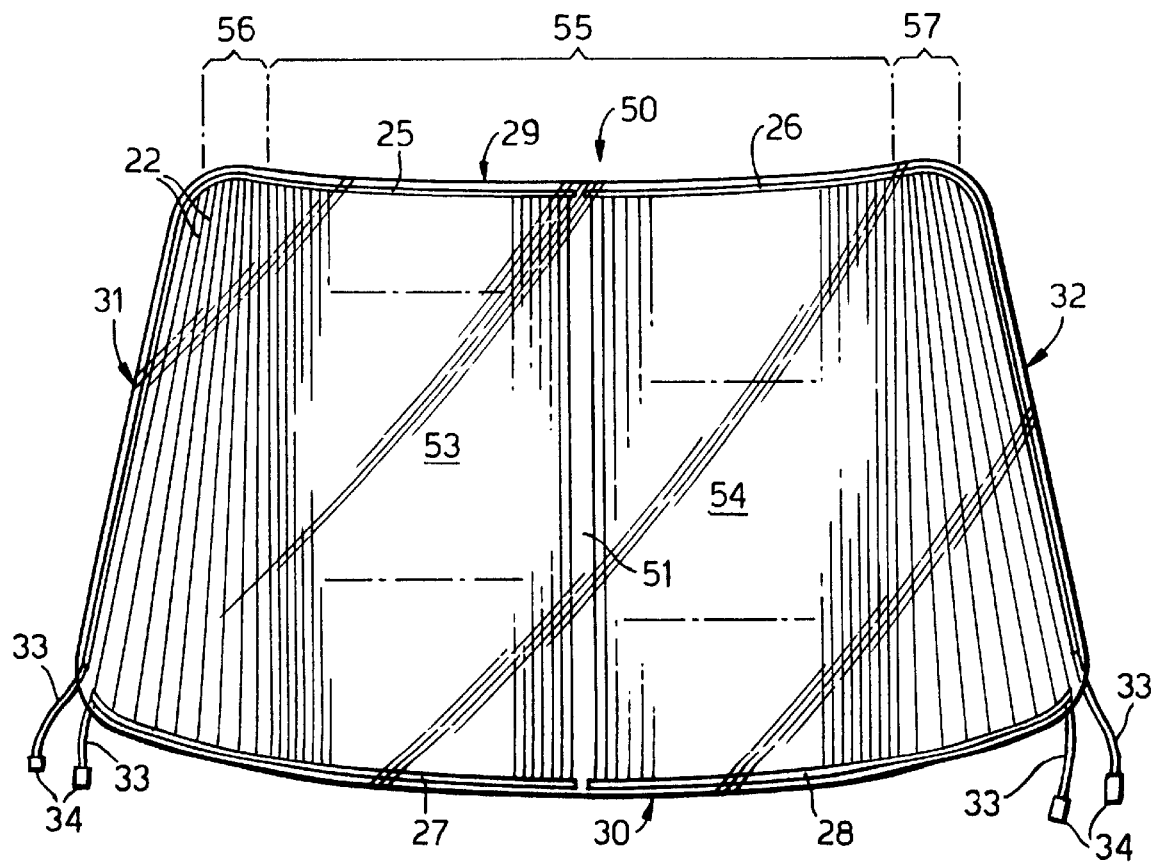
FIG. 4 is a general view of a second embodiment of electrically heated window, again viewed in a corresponding direction to FIGS. 1 and 2.

FIG. 4 shows a second embodiment of electrically heated window according to the invention, in which some of the wires extend along diverging lines, whereas other wires extend along substantially parallel straight lines. This embodiment is also particularly suitable for use as a windscreen of a vehicle. Many aspects of this window 50 are the same as, or equivalent to, the corresponding aspects of the window 20 described in connection with the first embodiment (FIGS. 2 and 3) and so these aspects will not be described further here. Such aspects include the composition of the window, i.e. from plies of glazing material and interlayer material; use and details of any obscuration band; and the materials used for the wires, busbars and their connection.

Window 50 also comprises an array 51 of fine, closely spaced wires 22, but the array differs from that of window 20 shown in FIG. 2 in that, in the preferred version of the embodiment illustrated, it comprises a central group 55 of wires extending along substantially parallel straight lines. Adjacent this group 55 of wires and on either side of it are further groups of wires, designated 56 and 57 respectively, which extend along diverging lines so that the array 51 extends over substantially the whole of the transparent portion of the window. The advantage of using wires extending along straight lines for part of the window, where its shape allows, is related to the time taken to manufacture the window, and will be explained in connection with FIG. 6 below. In FIG. 4 the array 51 is also divided into two heating elements, 53 and 54.

In both the embodiments described above, it is important to ensure that the particular arrangement of diverging wires selected for a window provides at least a moderately uniform heating effect (as measured, for example, in terms of heating power density) over the heated area. It is preferred that the ratio of the maximum heating power density to the minimum heating power density measured in different locations on the window should be less than 2.0, more preferably less than 1.5, and most preferably less than 1.3. Assuming the supply voltage is fixed, heating power density depends on the resistance of the wires (which itself depends on their thickness and length), the spacing of the wires, and is also affected by the degree to which the wires are crimped.

For satisfactory performance, the maximum spacing of the majority of wires in the transparent portion of a windscreen should not exceed 10 mm, preferably it is less than 5 mm, and it may be desirable to keep the spacing to 3 mm or less, especially in critical areas such as the primary vision area. Adjacent wires should not touch each other, so the minimum spacing is governed by the accuracy with which wires can be positioned during laydown, and the degree of crimp in use. The number of wires to be included in the array for a particular windscreen is chosen with regard to the wire spacing desired; clearly the spacing will tend to be greater towards the bottom of the windscreen than towards the top as a result of the divergence of the wires. There is therefore a corresponding tendency for the heating power density to reduce towards the bottom corners of the windscreen.

Variation in heating effect is also caused by variation in the length (and hence the resistance) of the wires. One of the advantages of the specific embodiments of the invention is that, owing to reducing busbar separation, the wires are shorter (and hence in operation run hotter) in the areas adjacent the sides 31,32 of the window where the maximum spacing tends to be greater. The effects of variation in spacing and length therefore compensate each other to a certain extent in this instance. Preferably, the resistance of the shorter wires is at least 50% of that of the longer wires, more preferably it is at least 70%, and in instances where particular uniformity of heating is required, it is at least 80%.

However, the positioning of the busbars on a window is also affected by the shape of the window, and the position at which the electrical connections are to be made. For this reason, and also for ensuring a moderately uniform heating effect in windscreens of extreme shape, it is desirable to have available another technique with which to compensate for the effect of wire spacing on heating power density.

In the course of the development of the present invention it was found that varying the degree of crimp in the wires provides such a technique. While the presence of a small degree of crimp is desirable to alleviate adverse optical effects, the degree of crimp may be varied above this minimum level apparently without further optical effect. This discovery may be exploited in several ways; for instance, it may be used to increase the resistance of a wire which would otherwise run too hot. By crimping such a wire more heavily, its actual length is increased, even though it still extends over the same busbar separation. Moreover, the degree of crimp may be used to bias the heat output of a wire towards one end, even though the current flowing in the wire is of course constant along its length. If the wire is more heavily crimped towards one end only, e.g. where it is at a greater spacing from the adjacent wire as a result of divergence, the heat output will be correspondingly greater towards that end.

Figure 5A:
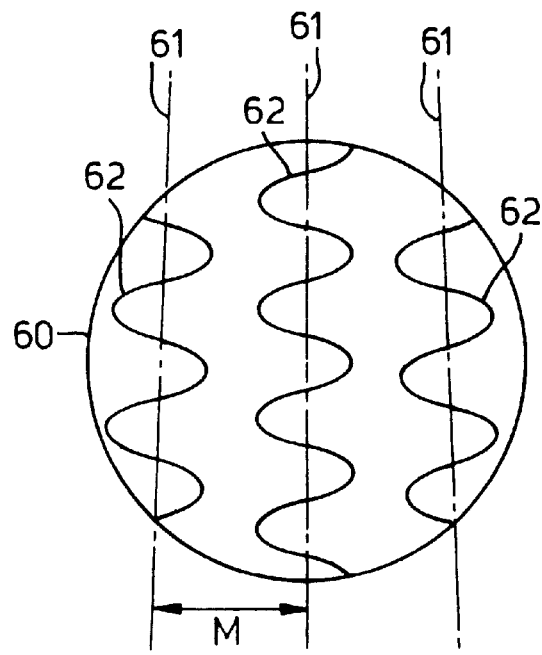
FIGS. 5a and 5b are greatly enlarged views of the heating wires in versions of the windows in which the wires are arranged differently in different portions of the window.
Figure 5B:
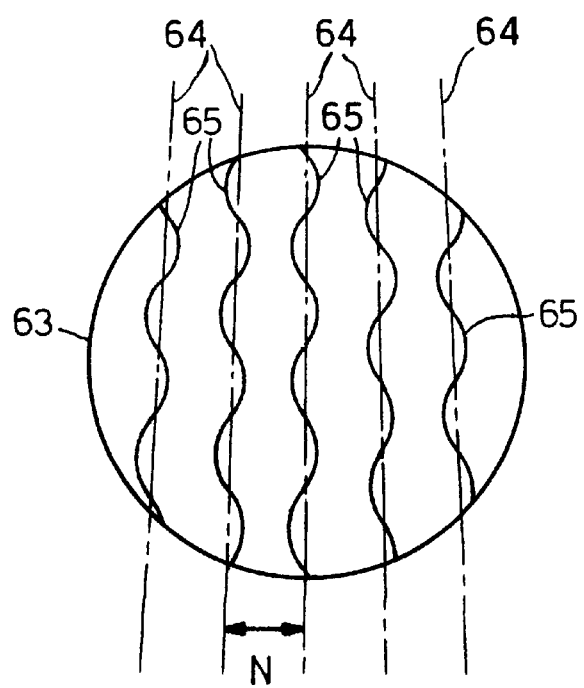

FIGS. 5a and 5b illustrate possible ways in which the degree of crimp may be varied. In FIG. 5a a circular area 60 of an array of wires is shown enlarged greater than actual size. The wires 62 extend along diverging lines 61 spaced at intervals denoted by arrow M, and are heavily crimped. Area 60 might be from a bottom corner of a windscreen, for example, where the wires are at a greater spacing as a result of divergence. In FIG. 5b, which is enlarged to the same extent as FIG. 5a, a different circular area 63 of wires is shown. Area 63 is from a different part of the array, and might for example be from a top corner of a windscreen. In FIG. 5*b*, the wires 65 extend along diverging lines 64 spaced at smaller intervals denoted by arrow N, and are only lightly crimped. Despite the difference in wire spacing, the heating power density in the two areas may be approximately the same as a result of the heavier crimp in area 60. In fact, the wires 65 and 62 might just be the same wires represented at different points along their length, in which case these Figures show how the degree of crimp may be varied along the length of individual wires.

The degree of crimp in a particular wire may conveniently be quantified by expressing it as the difference between the length of the wire when straight (i.e. before crimping) and the (shorter) length over which it extends after crimping, divided by the latter length and stating the ratio as a percentage, i.e.:

$$\frac{\text{Uncrimped length} - \text{Crimped length}}{\text{Crimped length}} \times 100\%$$

Expressed in these terms, the degree of crimp may vary between a minimal noticeable level, e.g. 1%, or possibly a higher level such as 3% or 5%, and a maximum which in practice is determined by the ability to control the heavily crimped wire during lay-down of the wire, e.g. 100%, preferably 50%, and certainly 30%.

Figure 6:
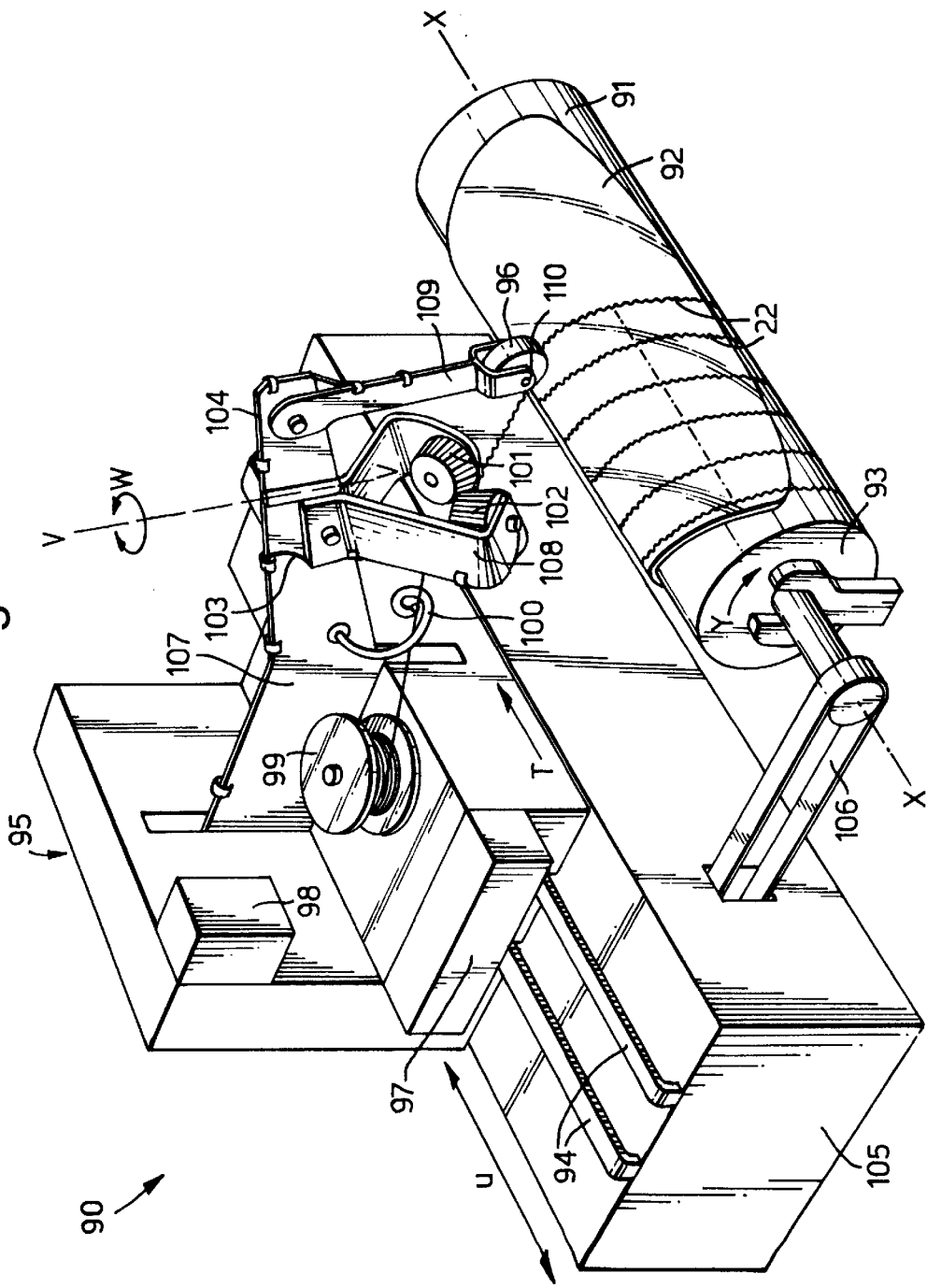
FIG. 6 is a perspective view of an apparatus for laying heating wires to make a window according to the invention, including an endless support surface in the form of a cylindrical drum.

FIG. 6 shows an apparatus 90 for laying heating wires along straight or diverging lines in various configurations so that, in the finished window, the array of wires extends over substantially the whole of the transparent portion of a window, as described above. The apparatus comprises a base 105, a wiring head 95 and an endless support surface 91 for the piece or pieces of interlayer material 92 ("the interlayer"). The support surface 91 is provided by the curved surface of a cylindrical drum 93, which is rotatable in the direction of arrow Y about an axis of rotation represented by dashed line X—X. The drum 93 is driven by belt 106 from a motor (not shown) within the base 105. Support surface 91 may be perforated and the internal air pressure of the drum 93 may be reduced to retain interlayer in contact with it. The interior of the drum may for instance be connected to an external suction means.

The preferred way of providing relative movement between the support surface 91 and the wiring head 95 is to mount the latter for sliding movement along one or more elongate members extending in a direction parallel to the axis X—X. As shown in FIG. 5, the elongate member is in the form of two rails 94 which extend parallel to the axis X—X, and are displaced to one side of drum 93. Other arrangements for providing translational movement of the wiring head are possible.

The wiring head 95 comprises devices for the supply of wire and for laying it on the interlayer 92. Wire is supplied from a spool of wire 99, which may additionally be provided with means for unwinding the wire, via wire guide means such as pulleys or eyes 100, and set in contact with the interlayer by means of a put-down roller 96. The spool and wire guide means are arranged to impart a slight tension to the wire, which assists in keeping the wire correctly threaded and under control.

Preferably, the wiring head also comprises means for imparting undulations to the wire for use when wiring interlayer for a windscreen, e.g. meshed pinions or bevel gears 101,102 through which the wire is fed so as to crimp it. The wire guide, crimp gears and put-down roller are all mounted on an arm 107, the crimp gears being mounted on the arm via an auxiliary frame 108, and the put-down roller via a pivotable link 109. Different crimp gears with different sizes of teeth may be used to obtain different initial levels of crimp. Furthermore, as the wire is also preferably maintained under slight tension as it passes from the wiring head onto the drum, some of the crimp may be pulled out of the wire. By varying the tension, the degree of crimp may thereby be varied on the run.

A preferred way of ensuring that the wire adheres to the interlayer after being set in contact with it is to heat the wire, since interlayer becomes tacky when hot, so hot wire tends to adhere to the interlayer. A preferred method of heating the wire is to pass an electric current through it, so preferably the wiring head includes means for applying a voltage across a length of wire close to where it is set in contact with the interlayer. A convenient way of achieving this is to apply a voltage between the put-down roller 96 and the crimp gears 101,102, by means of electrical leads 103,104 attached to a voltage source (not shown).

The put-down roller 96 is rotatable about an axis 110 passing through its centre, so that it can roll over the interlayer as it presses the hot wire into the surface of the interlayer. In order to accommodate changes in the direction of the diverging lines along which wire is laid, the put-down roller and part of the arm 107 can also be swivelled about a second axis substantially at right angles to the axis of rotation of the put-down roller. Such a second axis is shown by line V—V in FIG. 6, and arrow W shows the direction of swivelling. The axis V—V about which the roller, link and arm may be swivelled is preferably oriented substantially at right angles to a tangent to the support surface 91 taken at the point at which the put-down roller 96 makes contact with it (or with the interlayer). As an alternative to swivelling the put-down roller and part or all of the wiring head 95, just the put-down roller 96 and its mounting link 109 may be swivelled by themselves. In this case, the swivel axis is translated towards the put-down roller so as to pass through the point of contact between the put-down roller and the interlayer on the support surface, and a second wire guide means (not illustrated) may be provided adjacent the put-down roller to assist in keeping the wire in place on the put-down roller when the latter swivels.

The wiring head 95 also includes drive means 97, e.g. an electric motor, for propelling the wiring head back and forth along rails 94 in a reciprocating sliding manner, as indicated by arrow U. This reciprocating motion is in addition to an advancing motion indicated by arrow T, in other words, the drive means is capable of advancing the wiring head from one end of the drum to the other, as well as causing it to reciprocate during the course of such advancement. The various motions of which the drive means 97 is capable are controlled by control means 98, which is preferably an NC (numerical control) control means, and which coordinates the reciprocating movement of the wiring head with the rotation of the drum. Further details of the known aspects of this apparatus are available from EP 443 691.

Although only one piece of interlayer 92 is visible in FIG. 6, it is desirable to be able to wire two or more pieces at once.

Figure 7A:
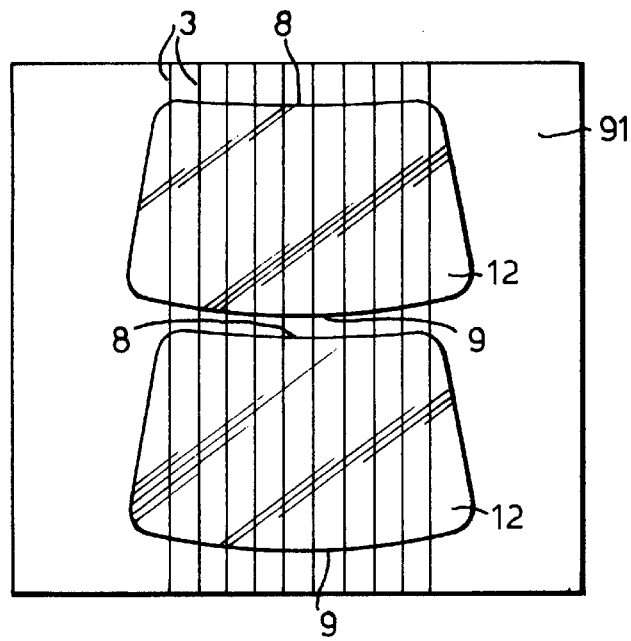
FIG. 7a is a diagram representing the cylindrical support surface of the drum of FIG. 6 as a flat rectangle, so that the entire support surface may be seen at the same time, showing schematically how wires may be laid when making two prior art windows of the type shown in FIG. 1.
Figure 7B:
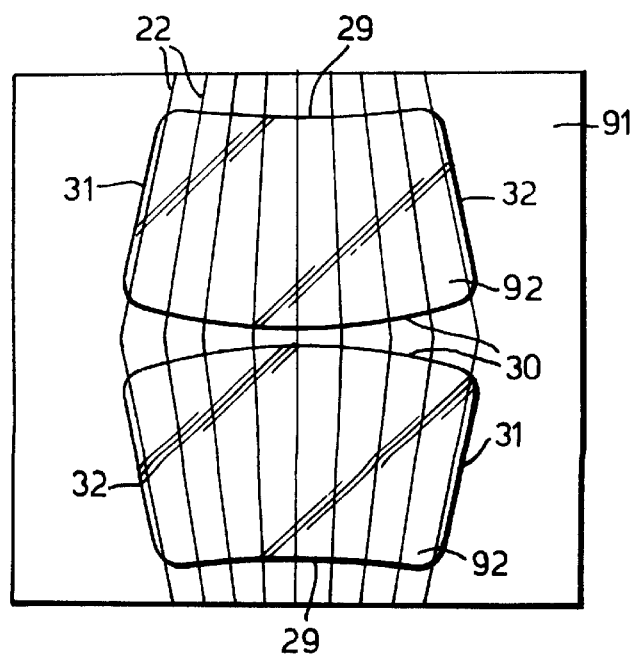
FIG. 7b is a similar diagram to FIG. 7a, showing schematically how wires may be laid when making two windows according to the first embodiment of the invention (FIG. 2).

FIG. 7 shows two ways of doing this; in FIG. 7*a*, an arrangement is shown for wiring two pieces of interlayer 12 for making the prior art window of FIG. 1, whereas in FIG. 7*b*, an arrangement is shown for making the window of FIG. 2. In each case, the endless support surface 91 of the drum 93 has been represented as a rectangle, as if the surface had been cut open and flattened out.

When making prior art windows (as shown in FIG. 1), an important consideration is to save space on the drum surface, and so the pieces of interlayer 12 are placed on the drum with the curvature of all the generally parallel long edges 8,9 facing the same way. This allows the pieces of interlayer to be placed as close to each other as possible, enabling the size of interlayer pieces which can be wired in pairs on a given drum to be maximised.

However, this arrangement of pieces of interlayer, while optimising use of the area of the support surface, is more difficult to wire with the wires extending along diverging lines which are generally parallel to the short edges 31,32 of the pieces, because the wire would have to turn two sharp corners in the area between the two pieces of interlayer to be re-aligned for the next piece. Hence a different arrangement of the interlayer pieces may be adopted which allows wiring to be carried out more quickly and reliably, although, as it does not make such efficient use of space on the support surface, one might initially be reluctant to consider it.

FIG. 7b shows an arrangement of pieces 92 of interlayer on support surface 91, which may be adopted when the pieces are for the manufacture of a windscreen as illustrated in FIG. 2. The longer edges 30 of the two parallel edges of each of the two interlayer pieces are placed adjacent each other, so that the two pieces are in an opposed relationship having substantial mirror symmetry about a line extending midway between the two longer edges. As seen in FIG. 7b, the lines along which the wires 22 are laid meet between the pieces of interlayer, making it possible for the wiring head 95 to traverse directly from one piece of interlayer onto the other without turning any sharp corners. The same arrangement may be used to make the window of FIG. 4. Clearly, if the support surface is large enough, the number of pieces could be increased to four, or even more.

The manufacture of a heated window according to the invention, including the operation of the wiring apparatus 90, will now be described with particular emphasis on the novel aspects.

A piece of interlayer cut to the appropriate shape and size for the window to be manufactured is placed on a horizontal surface in a clean environment. Lengths of tinned copper strip are placed in position on the interlayer to serve as part of the busbars, and secured in place. The piece of interlayer is then transferred to the endless support surface 91 of the wiring apparatus 90, and secured in place by conventional means as known from EP 443 691. A second piece of interlayer may similarly be placed on the drum as explained above.

During the laying down of wire, the drum 93 rotates and the wiring head 95 advances along the rails 94, as known from EP 443 691. Additionally, reciprocation of the the wiring head along the rails 94 is coordinated with the rotation of the drum. The head may perform an integral number of reciprocations for each revolution of the drum, so that after each complete revolution of the drum, the wiring head almost returns to its starting position, but not quite, the difference being equal to the spacing of successive turns of wire on the drum. When the drum holds two pieces of interlayer for a windscreen as shown in FIG. 7b, the movement of the wiring head is synchronised with the rotation of the drum, so that the wiring head performs one reciprocation for each revolution of the drum. The combination of the rotation of the drum and the movement of the wiring head results in the wire being laid along diverging lines on the piece of interlayer, so that, in the finished window, the array extends over substantially the whole of the transparent portion of the window. A coil of wire is built up on the drum, but unlike the prior art process, it is not a helical coil, as each turn of the coil is distorted from a spiral by the reciprocation of the wiring head.

The amplitude of reciprocation is varied according to the position of the wiring head 95 along the rails 94. For a windscreen, the amplitude is greatest when the wiring head is at either extreme of its travel along the rails, and smallest at the midpoint. In fact, if the windscreen is to have one or more wires laid along a straight line, such as along or parallel to its centre line (i.e. its axis of mirror symmetry), then during the laying of these wires the wiring head does not reciprocate at all; it merely advances so as to space the wires. Such wires are laid substantially parallel to the edges of the drum, allowing for the slight slant due to the wiring head advancing.

The wiring head also does not reciprocate during the laying-down of the parallel wires in the second embodiment of the invention (as shown in FIG. 4), i.e. the wires in the central group 55. Reciprocation only occurs during the laying-down of the wires in groups 56 and 57, which are laid along diverging lines. It is possible to run the wiring machine faster (i.e. a greater number of revolutions of the drum per minute) when the wiring head is not reciprocating, and so the FIG. 4 embodiment has the advantage that it can be made faster.

If a window is to be made which includes several groups of wires extending along parallel straight lines, with other groups of wires laid along diverging lines between or adjacent the groups of straight wires, then it would be necessary for the wiring head to reciprocate during the laying-down of all the wires except those substantially parallel to the edges of the drum. However, as the total number of differently orientated lines along which wires are laid down is still reduced compared to the FIG. 2 window in which every line is orientated differently, programming of the control means is simplified.

The speed at which the wiring head slides along the rails as it reciprocates during the wiring of a piece of interlayer varies according to the amplitude of reciprocation, for a given rate of revolution of the drum. When the amplitude is greater, the wiring head has to travel a greater distance along the rails per reciprocation, and so it slides at a correspondingly greater speed.

One of the advantages of this process is that it is possible to wire pieces of interlayer quickly and hence economically. Although precise times vary, e.g. according to the number of wires in the window being manufactured, the time taken to wire one or two pieces of interlayer (i.e. the number of pieces that may be placed on the support surface together) is less than 3 hours, and may be less than 2 hours, or even less than 1 hour.

When wiring is complete, pieces(s) of interlayer are removed from the drum and again placed flat on a horizontal surface. Further lengths of tinned copper strip are laid on top of the previously positioned strips where the wires cross them, and soldered in position so that the busbar is of two-layer or "sandwich" construction, as taught by EP 385 791, in the region where the wires make contact with the busbars.

The window is completed by performing steps which are known, and hence described only briefly. Further electrical connection means (e.g. flying leads, connectors etc.) are attached, and the wired piece of interlayer is placed between complementary curved plies of glazing material. Air is then removed from the assembly, and it is subjected to high temperature and pressure in an autoclave so that the interlayer material bonds the plies of glazing material together. If low melting point solder was pre-applied to the lengths of busbar strip, then this fuses in the autoclave and ensures good electrical connection between the wires and the busbar.

What is claimed is:

1. An electrically heated window having a transparent portion, the window being in the approximate shape of a trapezium and comprising:
   at least two plies of sheet glazing material,
   at least one ply of interlayer material, the electrically heated window being laminated from said plies of sheet glazing material and interlayer material with the ply of interlayer material extending between the plies of sheet glazing material,
   an array of fine, closely spaced wires carried by one of said plies,
   at least some of said wires extending along diverging lines and fanning out so that the array extends over substantially all of the transparent portion of the window,
   electrical connection means for connecting the array to an electrical supply so as to pass current through the wires and heat substantially all of the window,
   the array of wires being configured to limit any variation in heating effect over the transparent portion of the window.

2. A window as claimed in claim 1, wherein the array of wires comprises one or more groups of wires extending along substantially parallel straight lines, and the wires adjacent the group(s) extending along diverging lines.

3. A window as claimed in claim 1, wherein substantially all the wires comprised in the array extend along diverging lines.

4. A window as claimed in claim 1, wherein the ratio of the maximum heating power density to the minimum heating power density measured in different locations on the window is less than 2.0.

5. A window as claimed in claim 4, wherein the ratio is less than 1.5.

6. A window as claimed in claim 1, wherein the spacing of adjacent wires is less than 10 mm.

7. A window as claimed in claim 6, wherein the spacing is less than 5 mm.

8. A window as claimed in claim 1, wherein at least some of the wires are crimped, and the degree of crimp varies.

9. A window as claimed in claim 8, wherein the degree of crimp (expressed as the difference between the length of the wire when straight and when crimped, divided by its length when crimped, and stated as a percentage) varies between 1% and 100%.

10. A window as claimed in claim 8, wherein the degree of crimp is increased in a portion of the window where the spacing of the wires is greater.

11. A window as claimed in claim 1, wherein at least some of the lines along which the wires extend are substantially parallel to one edge of the window.

12. A window as claimed in claim 1, wherein at least some of the wires extend along diverging lines in directions from the shorter of the two substantially parallel edges of the trapezium towards the longer of the two substantially parallel edges.

13. An electrically heated window having a transparent portion, the window being in the approximate shape of a trapezium and comprising:
   at least two plies of sheet glazing material,
   at least one ply of interlayer material, the electrically heated window being laminated from said plies of sheet glazing material and interlayer material with the ply of interlayer material extending between the plies of sheet glazing material,
   an array of fine, closely spaced wires carried by one of said plies,
   at least some of said wires extending along diverging lines and fanning out so that the array extends over substantially all of the transparent portion of the window,
   electrical connection means for connecting the array to an electrical supply so as to pass current through the wires and heat substantially all of the window.

14. A process for the manufacture of an electrically heated window laminated from at least two plies of sheet glazing material and at least one ply of interlayer material, the window including an array of fine, closely spaced wires, wherein part of the process is performed on an apparatus which includes an endless support surface, rotatable about an axis, for supporting the interlayer material, and a wiring head for supplying wire and laying it on the interlayer material, the support surface and wiring head being movable relative to each other in a direction parallel to said axis, and the process including the steps of:
   securing a piece of interlayer material on the support surface,
   causing the support surface to rotate,
   laying wire by setting the wire in contact with the interlayer material by way of the wiring head while the support surface rotates, so that successive turns of wire are laid on the interlayer material;
   moving the support surface and the wiring head back and forth relative to each other in a reciprocating manner in the direction parallel to said axis, and in coordination with the rotation of the support surface, to provide an array of wires on the interlayer material in which at least some of the wires extend along diverging lines and fan out,
   stopping rotation of the support surface when a desired number of turns of wire has been laid,
   cutting the coil in a direction parallel to the axis, so that it may be opened out as a generally flat array of wires,
   removing the wired piece of interlayer material from the support surface and providing the array of wires with electrical connections, and
   assembling the piece of interlayer material into a laminated window.

15. A process as claimed in claim 14, wherein the number of reciprocations that the wiring head performs for each revolution of the support surface is an integer.

16. A process as claimed in claim 15, wherein the relative reciprocating movement of the wiring head and the support surface is synchronized, so that the wiring head performs one reciprocation for each revolution of the support surface.

17. A process as claimed in claim 16, wherein the piece of interlayer material is in the approximate shape of a trapezium, thereby having two generally parallel edges, and two such pieces are placed on the support surface with the longer of the parallel edges of each piece adjacent each other, so that they are in opposed mirroring relationship.

18. A process as claimed in claim 14, wherein the amplitude of reciprocation of the wiring head varies with its position along the line parallel to said axis.

19. A process as claimed in claim 18, wherein the amplitude is greatest when the wiring head is at either extreme of its travel relative to the interlayer material, and the amplitude is smallest when the wiring head is at the midpoint of its travel relative to the interlayer material.

20. A process as claimed in claim 14, wherein the support surface and the wiring head are moved relative to each other so as to lay the wire at a variable spacing of less than 10 mm.

21. A process as claimed in claim 20, wherein the spacing is less than 5 mm.

22. A process as claimed in claim 14, including crimping the wire, and arranging for the degree of crimp in the wire laid on the interlayer material to vary.

23. A process as claimed in claim 22, wherein the degree of crimp (expressed as the difference between the length of the wire when straight and when crimped, divided by its length when crimped, and stated as a percentage) in the wire laid on the interlayer material varies between 1% and 50%.

24. An apparatus for forming an array of wires on a piece of interlayer material during the manufacture of an electrically heated window, the apparatus comprising:

an endless support surface for supporting the interlayer material, rotating means to rotate the endless support surface about an axis of rotation, a wiring head for supplying wire and laying it on the interlayer material, the support surface and the wiring head being arranged for relative movement in a direction parallel to said axis of rotation, drive means for reciprocating the support surface and wiring head relative to each other in said parallel direction, and control means for controlling the drive means to co-ordinate the reciprocating movement of the support surface and wiring head with the rotation of the support surface, so that the wiring head lays wire along diverging lines which fan out.

25. An apparatus as claimed in claim 24, wherein the wiring head is movably mounted on an elongate member which extends parallel to said axis of rotation, and is propelled along said elongate member in reciprocating manner by the drive means.

26. An apparatus as claimed in claim 24, wherein the wiring head includes a put-down roller rotatable about a first axis for setting the wire in contact with the interlayer material, the roller being mounted for swivelling movement about a second axis perpendicular to the first axis, so that the roller may swivel to follow a diverging line along which wire is being laid.

* * * * *